United States Patent Office

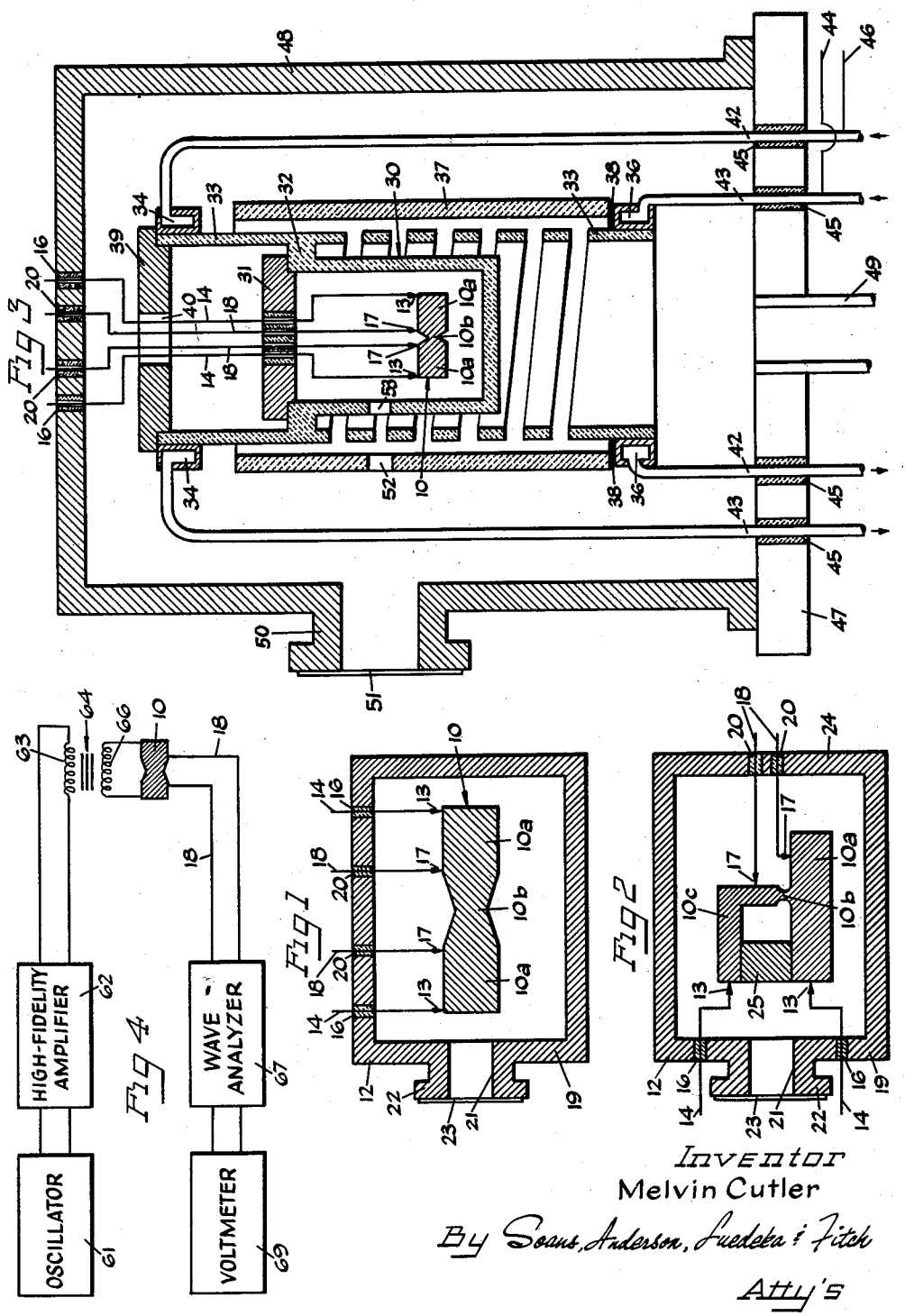

3,106,085
Patented Oct. 8, 1963

3,106,085
MEASUREMENT OF THERMAL CONDUCTIVITY
Melvin Cutler, San Diego, Calif., assignor to General
  Dynamics Corporation, New York, N.Y., a corporation
  of Delaware
Filed Nov. 21, 1960, Ser. No. 70,681
9 Claims. (Cl. 73—15)

This invention relates to methods of and apparatus for measuring thermal conductivity.

Thermal conductivity (K), which may be defined as the time rate of heat conduction per unit of area, per unit of temperature gradient, is a parameter that has heretofore proven to be extremely difficult to measure with adequate accuracy. Accordingly, various static and dynamic measuring techniques have been developed in an attempt to provide a reasonably simple yet accurate method of measuring this parameter.

For the most part these methods necessitate either the use of rather complex measuring apparatus or require mathematical corrections to compensate for extraneous factors which bear on the measurement of thermal conductivity. Therefore, such prior methods have not proven to be entirely satisfactory. Additionally, the various prior techniques for measuring thermal conductivity are not completely acceptable inasmuch as these methods require either the measurement of certain physical characteristics of a material that are difficult to determine or are limited to measurements at moderate temperatures.

Accordingly, it is the principal object of the present invention to provide an improved method of measuring thermal conductivity.

Still another object of the present invention is to provide an accurate method of measuring thermal conductivity of a specimen of material while disposed in an inaccessible environment of high energy radiation.

A more specific object of the present invention is the provision of a method of and apparatus for determining thermal conductivity of a material at high temperatures as deduced from a change in the resistance of a uniquely shaped specimen thereof.

Other objects and advantages of the present invention will become apparent from the following description when considered in conjunction with the accompanying drawing, wherein:

FIGURE 1 is a vertical cross-sectional view of a simplified form of apparatus for measuring thermal conductivity of a material in accordance with the principles of the present invention;

FIGURE 2 is a vertical cross-sectional view of another form of apparatus for measuring thermal conductivity;

FIGURE 3 is a vertical cross-sectional view depicting a vacuum furnace which is suitable for accomplishing the measurement of thermal conductivity of a specimen of material at high temperatures; and FIGURE 4 is a diagrammatic representation of a circuit which may be utilized in conjunction with the oven structures illustrated in FIGURES 1 and 3 to determine the thermal conductivity of a material.

In general, the present invention relates to methods of and apparatus for measuring thermal conductivity of a uniquely shaped specimen of material. The specimen is formed in a preselected configuration so that one portion thereof is of reduced cross-section. In accordance with the provisions of the invention, the formed specimen is suspended in a high temperature environment and a current of moderate magnitude is passed through the portion thereof having the reduced cross-section. The temperature of the environment wherein the specimen is disposed is thereafter varied over a range in steps of preselected magnitude, and the resistance of that portion of the specimen having the reduced cross-section is measured at each of these temperatures.

Various well known and readily ascertainable parameters of the specimen are deduced from the measurements taken at each of the selected temperatures. Finally, the current through the portion of reduced cross-section at one of these selected temperatures is increased to a substantially higher value resulting in an increase in the temperature and a change in the resistance thereof. The change in resistance resulting from the large current is observed and measured. The measured change in resistance, as well as the values of the parameters which were calculated at the selected temperature, are then utilized to deduce the value of thermal conductivity of the material.

In analyzing the problem of thermal radiation and the effects thereof on measurements of various thermoelectric parameters such as thermal conductivity, a determination has been made that the impedance of a specimen to heat flow by radiation is extremely high if the specimen is made sufficiently small. Therefore, the measurements of thermal conductivity of a specimen even at temperatures above 2000° C. will be substantially unaffected by thermal radiation if the dimensions thereof are properly chosen.

Additional information derived from an investigation of methods of measuring thermoelectric parameters has revealed that the passage of energy in the form of electrical current through a specimen, which is formed to provide a portion of reduced cross-section (sometimes called a necked-down region), will produce a local rise in the temperature of this necked-down region. The increase in temperature effected by heat flow through the necked-down region can be determined from the magnitude of the accompanying change in the resistance thereof. It has been found that the change in the resistance of the portion of the specimen having a reduced cross-section which results from the passage of heating current therethrough is directly related to the thermal conductivity of the material by the relationship expressed in Equation 1:

$$K = \frac{\sigma}{12 \delta R}(I_\mathrm{h}^2 R^2)\left(\frac{dR}{dT}\right) \qquad (1)$$

wherein:

$K$ = thermal conductivity of the specimen of the material
$\sigma$ = electrical conductivity at a selected temperature
$R$ = resistance of necked-down region with small current applied
$\delta R$ = measured change in resistance of the necked-down region resulting from the passage of heating current therethrough
$I_\mathrm{h}$ = heating current passed through the necked-down region
$dR/dT$ = temperature coefficient of resistance of the specimen at a selected temperature It is apparent from Equation 1 that the relationship of the change in resistance of the necked-down region to the thermal conductivity of the material is independent of the physical dimensions of this region. Therefore, the primary factor to be considered in choosing the size and shape of the necked-down region is that the diameter thereof be made sufficiently small so that no error is induced in the measurement by the effects of thermal radiation at very high temperatures. It has been determined when heating current is passed through a necked-down region whose diameter is of the order of .01 cm., thermal radiation even at temperatures above 2000° C. can be avoided. Accordingly, utilizing the relationship expressed in Equation 1, thermal conductivity (K) of materials, specimens of which have been formed in a necked-down configuration, can be accurately determined from the values of certain well known parameters that can be measured at temperatures above 2000° C. without being influenced by the effects of thermal radiation.

Referring to FIGURES 1 and 2, simplified oven structures will be described which can be advantageously utilized to accomplish measurements of thermal conductivity in accordance with the provisions of the present invention. A specimen of material 10 which is formed in a necked-down configuration is illustrated as being suspended within a vacuum oven 12. As illustrated in FIGURE 1, the specimen 10, which can be fabricated of any material for which the value of thermal conductivity (K) is sought, is provided with cylindrically shaped end portions 10a and necked-down central portion 10b. As shown, the diameter of the specimen 10 decreases uniformly from the end portions 10a to a minimum value at the necked-down region 10b. The diameter of this necked-down region is made sufficiently small so that thermal radiation has little effect on the flow of heat through this portion of the specimen.

As illustrated, one each of a pair of current probes or leads 13 is electrically connected to the oppositely disposed cylindrical end portions 10a of the specimen 10. A complete path for current flow from a source (not shown) through each of the probes 13 and the portion of the specimen 10 having the reduced cross-section is provided by a pair of conductors 14. The conductors 14 pass into the oven through suitable vacuum-tight insulating bushings 16 provided in the upper wall thereof.

Also maintained in electrical contact with the specimen 10 on oppositely disposed sides of the necked-down region 10b is a pair of potential probes 17. Conductors 18, which pass into the oven through vacuum-tight bushings 20, are connected to the potential probes 17 and transmit any voltage developed across the necked-down region to a suitable measuring instrument (not shown) which is preferably calibrated in units of resistance.

Referring again to FIGURE 1, one side wall 19 of the oven 12 has an aperture 21 formed therein. Projecting outwardly from the side wall 19 adjacent the aperture 21 is a circular mounting plate 22 to which a window 23 of suitable material is secured. The window 23, which is mounted across the aperture 21, provides a location whereat an optical pyrometer (not shown) is positioned to obtain measurements of the ambient temperature within the oven.

The vacuum oven 12 illustrated in FIGURE 2 is substantially identical to the embodiment depicted in FIGURE 1. The primary structural distinction between the two ovens is the location of the vacuum-tight insulating bushings 16 and 20 wherethrough the conductors 14 and 18 extend. The variation in the location of the bushings 16 and 20 as illustrated in FIGURE 2 is necessitated by the difference in the structural shape of the specimen 10 which is suspended therein.

As illustrated in FIGURE 2, the necked-down region 10b is formed between a horizontally disposed cylindrical member 10a and an L-shaped member 10c. The current probes 13 are connected to vertically aligned extremities of each of the members 10a and 10c and the current-carrying conductors associated therewith extend through the bushings 16 which are mounted in the side wall 19 on either side of the window 23.

The potential probes 17 are connected to either side of the necked-down region 10b, one each of the potential probes being connected to the cylindrical member 10a and a downwardly projecting portion of the L-shaped member 10c. The conductors 18, which transmit the potential developed across the necked-down region to a suitable measuring device (not shown), extend through bushings 20 mounted in a side wall 24 of the oven 10. Positioned between the vertically aligned extremities of the members 10a and 10c whereto the current probes 13 are connected is a block of insulating material 25 which serves to structurally fortify the L-shaped member 10c and insulate this member from the cylindrical member 10a.

The more detailed oven structure illustrated in FIGURE 3 utilizes the principle of black-body radiation and is particularly suitable for accomplishing measurements of thermal conductivity at high temperatures. As shown, a specimen 10 is suspended within an oven crucible or hohlraum (uniform temperature cavity which may have opaque inner walls) 30. Current and potential probes 13 and 17 are maintained in electrical contact with the specimen in a manner analogous to that disclosed in FIGURE 1. Conductors 14 and 18 are attached to the probes and extend out of the crucible 30 through suitable air-tight insulating bushings embedded in a plug 31. The plug 31 is seated within a collar 32 which serves as the upper rim of the crucible 30. The collar 32 extends inwardly from and forms a part of the inner wall of a cylindrical heater 33 which is preferably fabricated of a material such as graphite.

In a preferred embodiment of the invention, the portion of the heater 33 extending above the collar 32 is a solid cylinder of graphite which is proportioned so that an electrode member 34 can be mounted about the outer periphery thereof and maintained in fixed relation thereto. A plug 39 is seated within this upper extremity of the heater 33 and conductors 14 and 18 associated with the current and voltage probes 13 and 17 extend upwardly through an aperture 40 provided therein. The portion of the heater 33 extending downwardly from the collar 32 is formed in spiral fashion and serves as the heating element for the crucible 30.

The structural characteristics of the lowermost extremity of the heater 33 are similar to those of the uppermost portion. Accordingly, the portion extending below the spiral-section of the heater is a cylindrical graphite member proportioned so that an electrode member 36 can be mounted about the outer periphery thereof in fixed relation thereto. A cylindrical heat shield 37, which has an outer diameter slightly larger than the diameter of the electrodes 34 and 36, is supported on the lower electrode member 36 and encompasses the spiral portion of the heater 30. A suitable insulating disc 38 is positioned between the lower extremity of the heat shield 37 and the electrode 36.

The electrode members 34 and 36 which encompass the heater 33 are cooled by water which is supplied to the hollow inner portions thereof through circulating pipes 42 and 43. Heating current is supplied to the electrodes 34 and 36 from a source thereof (not shown) through conductors 44 and 46 and the circulating pipes 42 and 43. The circulating pipes 42 and 43 extend through air-tight insulated apertures 45 provided in a base plate 47 which serves as a support means for a vacuum container 48. The vacuum container 48 encompasses the entire inner structure and serves to provide a chamber whose temperature can be maintained at a uniform level. A length of tubing 49, which is secured within the base plate 47, is connected to a suitable vacuum pump (not shown) that maintains the inner chamber formed by the container 48 in an evacuated state.

One side wall of the vacuum container 48 has an aperture provided therein that extends through a projecting mounting plate 50 to which a window 51 of suitable material is secured. The window provides a location whereat an optical pyrometer (not shown) is positioned so that the temperature of the crucible 30 can be measured. The window 51 is aligned with slots 52 and 53 provided in the side walls of the heat shield 37 and the crucible 30. The narrow slot 53 formed in the crucible 30 is the only opening provided therein through which thermal radiation can emanate. Substantially all the thermal radiation entering the crucible through the slot is trapped by multiple reflections from the inner walls thereof. These structural features result in the crucible functioning substantially as a black-body and no emissivity correction is required in the measured values of the ambient temperature of the crucible. Accordingly, the temperature coefficient of resistance utilized in the determination of the thermal conductivity of a specimen suspended within the crucible 30 can be determined with a high degree of accuracy.

Utilizing any of the various oven structures illustrated in FIGURES 1 through 3 or modifications thereof, a measurement of thermal conductivity is initiated by passing a substantially constant current (I) through the conductors 14 and the necked-down region of the specimen 10. As a result of the passage of current through the necked-down region 10b, a voltage is developed thereacross between the potential probes 17. This voltage is measured and value recorded by a measuring instrument connected to the potential probes to yield a direct reading of the resistance (R) of the necked-down region.

The temperature (T) within the oven wherein the specimen is suspended and, accordingly, the temperature of the specimen 10 is controlled from external means (not shown). This temperature is selectively varied over a range in steps of any desired magnitude from a minimum to a maximum value, and the value of the resistance (R) of the necked-down region is observed and recorded at each of the temperatures.

The measured value of resistance (R) of the necked-down region obtained at each of the selected temperatures over the chosen range is utilized to determine the value of electrical conductivity ($\sigma$) and the temperature coefficient of resistance ($dR/dT$) of the specimen 10 as a function of the temperature (T).

A change in the resistance ($\delta R$) of the necked-down region 10b is effected by thereafter passing a step function of heating current ($I_h$) therethrough having a substantially higher value than the current initially applied to the specimen. This current ($I_h$) heats this region of the sample to a temperature slightly higher than the measured ambient temperature of the oven and produces a corresponding increase in the resistance thereof. The value of heating current ($I_h$) as well as the change in resistance ($\delta R$) of the sample, which is measured between the probes 17, are recorded and utilized in conjunction with the values of the other parameters to deduce the value of thermal conductivity from the relationship expressed in Equation 1.

While a step function of direct current is preferably utilized to effect heating of the necked-down sample so that a value of thermal conductivity may be deduced from Equation 1, still another method of determining a value of thermal conductivity in accordance with the provisions of the present invention utilizes the principle of harmonic generation through alternating current heating.

It has been found that the passage of an alternating heating current through the necked-down region of a specimen of material develops two voltage components across the necked-down region. The first and larger of these voltages is proportional to the heating current passed through the necked-down region. The second, rather small voltage is proportional to the change in the resistance ($\delta R$) of the necked-down region resulting from the heating effected by the passage of a larger alternating heating current therethrough. If the frequency of this alternating heating current is made sufficiently high, the larger cylindrical end portions of the sample cannot follow the variation of heating produced thereby. However, it has been determined that while the frequency of the current must be high enough, it must also be sufficiently low so that the temperature of the necked-down region will follow the heat input. These conditions are met if the frequency and dimensions of the specimen are chosen such that the following inequality exists:

$$D/L^2 \gg \omega \gg D/L_1^2$$

wherein:

$D$ = thermal diffusivity of the material
$L$ = the size of the necked-down region
$L_1$ = smallest dimension of the end portions of the sample
$\omega$ = frequency of the alternating current applied If the foregoing conditions are met, a relationship of thermal conductivity to the small change in voltage corresponding to the change in the resistance of the necked-down region exists which is expressed in Equation 2:

$$K = \frac{1}{48} \frac{\sigma}{\delta V}(dR/dT) I_0^3 R^2 \cos 3\omega t \qquad (2)$$

wherein:

$K$ = thermal conductivity of the specimen
$\sigma$ = electrical conductivity at a selected temperature
$R$ = resistance of the necked-down region with a small current applied
$I_0$ = alternating heating current which effects the change in resistance of the necked-down region
$\delta V$ = voltage component corresponding to the change in the resistance ($\delta R$) of the necked-down region
$dR/dT$ = temperature coefficient of resistance of the specimen at a selected temperature
$\omega$ = frequency of the alternating heating current passed through the necked-down region of the specimen While values of the various parameters expressed in Equation 2 are measured or determined in substantially the same manner as described hereinbefore with regard to the measurement of the parameters expressed in Equation 1 (i.e. R, $dR/dT$ and $\sigma$), certain additional circuit components are utilized to establish the alternating heating current which is passed through the necked-down region of the specimen and to measure the change in voltage ($\delta V$) which is effected by the change in the resistance ($\delta R$) thereof. Inasmuch as the voltage component ($\delta V$) expressed in Equation 2 is proportional to both the heating current ($I_0 \cos \omega t$) and the change in the resistance ($\delta R$) of the necked-down region, this voltage varies as the third harmonic of the alternating current frequency. More particularly, since this change in resistance ($\delta R$) is proportional to the square of the heating current, the change in voltage ($\delta V$) due to heating is proportional to the current ($I_0 \cos \omega t$) cubed or $I_0^3 \cos 3\omega t$.

Referring to FIGURE 4, the system which provides an alternating heating current will be described. The heating current must have sufficient harmonic purity so that the third harmonic component in the voltage developed across the necked-down region can be readily observed and measured. Accordingly, oscillator 61 produces an alternating current signal of predetermined frequency ($\omega$) which satisfies the conditions expressed in the inequality set forth above. The output of the oscillator 61 is fed to a high fidelity amplifier 62 which ensures that the frequency of the signal fed to the primary 63 of the transformer 64 is maintained at the desired value.

The alternating heating current ($I_0 \cos \omega t$) produced in the secondary 66 of the transformer 64 is passed through the necked-down region of the specimen thereby developing a voltage thereacross having a component due to the heating current itself and another component due to a change in the resistance of the necked-down region as a result of the passage of heating current therethrough. The small voltage ($\delta V$) generated at the third harmonic frequency is fed to a wave analyzer 67 which is in essence an amplifier that is sharply tuned to the third harmonic frequency. The amplified third harmonic component of the voltage developed across the output of the wave analyzer is thereafter fed to a voltmeter or other suitable measuring device 69. This value of voltage ($\delta V$), as well as the values of the other parameters expressed in Equation 2, are thereafter utilized to deduce a value of thermal conductivity at a selected temperature in terms of the relationship expressed therein.

Still another application of the preferred methods of measuring thermal conductivity described above in conjunction with the oven structures disclosed in FIGURES 1 through 3 is the determination of the thermal conductivity of a material over the range of temperatures developed in reactor cores. More particularly, the described methods may be advantageously utilized to determine the effects of high energy radiation damage on the value of thermal conductivity of a specimen disposed within a high temperature reactor core.

By appropriately modifying a reactor so that a sample hole is provided wherein a specimen of material having a necked-down configuration may be suspended along with suitable current and potential probes attached thereto, a value of the thermal conductivity of the specimen can be determined while irradiation of the specimen is concomitantly taking place. The various measurements which must be made in order to determine the value of thermal conductivity in accordance with the relationship expressed in Equations 1 and 2 are, except for temperature measurements, all electrical and therefore can readily be made outside the reactor. Temperature measurements can be accomplished by observing the heat input to the reactor or by a suitable temperature sensing device, such as a thermopile which can be suspended in the reactor chamber along with the necked-down specimen of material. As the various current and resistance measurements are taken, the effects of radiation can be simultaneously observed.

It should be understood that the above described methods of measuring thermal conductivity are simply illustrative of the application of the invention. Numerous controlled temperature devices wherein properly proportioned specimens can be suspended could be devised by those skilled in the art, so that the desired measurements required to determine the value of thermal conductivity could be accomplished. Other parameters which are directly related to those expressed in Equations 1 and 2 could be observed and measured and the equations could be modified to provide a relationship from which a value of thermal conductivity could be deduced in accordance with the provisions of the invention. Such modifications would clearly embody the principles of the present invention and fall within the spirit and scope of the inventive concept defined in the following claims.

What is claimed is:

1. A method of measuring the thermal conductivity of a material, which method comprises the steps of forming a specimen of the material so that one portion thereof is of reduced cross-section, disposing the formed specimen in an atmosphere of controlled temperature, passing a current of preselected magnitude through the reduced portion of the specimen, selectively varying the temperature of said controlled atmosphere over a range of temperatures in steps of preselected magnitude, measuring the voltage developed across the reduced portion of the specimen during the passage of current therethrough at each temperature over the range, increasing the magnitude of the current passed through the reduced portion of the specimen to a substantially higher value while maintaining the temperature of the atmosphere at a selected value so that heating of the reduced portion of the specimen is effected by the increased current passed therethrough and the resistance thereof changes, and measuring the voltage developed across the reduced portion of the specimen with the increased heating current passing therethrough so that the value of thermal conductivity of the specimen can be determined from a relationship which expresses thermal conductivity in terms of the values of voltage and resistance derived from the measurements accomplished with both magnitudes of current passing through the reduced portion of the specimen.

2. A method of measuring thermal conductivity of a material, which method comprises the steps of forming a specimen of the material so that one portion thereof is of reduced cross-section, disposing the formed specimen in an atmosphere of controlled temperature, passing a current of predetermined magnitude through the reduced portion of the specimen, selectively varying the temperature of the atmosphere wherein the specimen is disposed over a range of temperature in steps of preselected magnitude, measuring the resistance of the reduced portion of the specimen at each temperature over the range, increasing the magnitude of current passed through the reduced portion of the specimen to a substantially higher value while maintaining the temperature thereof at a selected value within the range so that heating of the reduced portion is effected by the increased current and the resistance thereof changes, and measuring the change in the resistance of the reduced portion of the specimen resulting from the increase in the magnitude of the current passed therethrough, the value of thermal conductivity of the specimen at the selected temperature bearing on the measured change in resistance in accordance with the following equation:

$$K = \frac{\sigma}{12\delta R}(I_h^2 R^2)\left(\frac{dR}{dT}\right)$$

wherein:

$K$ = thermal conductivity of the specimen
$R$ = measured value of resistance of the reduced portion of the sample with the current of predetermined magnitude passing therethrough
$\sigma$ = electrical conductivity of the specimen at the selected temperature as determined from the measured value of resistance (R)
$dR/dT$ = temperature coefficient of resistance of the specimen at the selected temperature as determined from the measured value of resistance (R)
$\delta R$ = measured change in the resistance of the reduced portion of the specimen
$I_h$ = current of increased magnitude (heating current) which effects a change in the resistance of the reduced portion of the specimen 3. A method of measuring thermal conductivity of a material, which method comprises the steps of forming a specimen of the material in a necked-down configuration, suspending the formed specimen in an environment having a high ambient temperature, passing a current of preselected magnitude through the necked-down region of the specimen, measuring the resistance of the necked-down region with the current of preselected magnitude passing therethrough, increasing the magnitude of the current passed through the necked-down region while maintaining the ambient temperature of the environment wherein the specimen is suspended at a constant value so that heating of the necked-down region is effected by the increased current and the resistance thereof changes, and measuring the change in the resistance of the necked-down region of the specimen resulting from the increase in the magnitude of the current passed therethrough, the value of the thermal conductivity of the specimen bearing on the measured change in the resistance of the necked-down region in accordance with the following equation:

$$K = \frac{\sigma}{12\delta R}(I_h^2 R^2)\left(\frac{dR}{dT}\right)$$

wherein:

$K$ = thermal conductivity
$R$ = measured value of resistance of the necked-down region with the current of preselected magnitude passing therethrough
$\sigma$ = electrical conductivity of the specimen at the ambient temperature of the environment as determined from the measured value of resistance (R)

$dR/dT$=temperature coefficient of resistance of the specimen at the ambient temperature of the environment as determined from the measured value of resistance (R)

$\delta R$=measured change in the resistance of the necked-down region of the specimen $I_h$=current of increased magnitude (heating current) which effects the change in the resistance of the necked-down region 4. A method of measuring thermal conductivity of a material, which method comprises the steps of forming a specimen of the material in a necked-down configuration, suspending the formed specimen in an environment having a controlled ambient temperature, passing a current of preselected magnitude through the necked-down region of the specimen, selectively varying the ambient temperature of the environment over a range of temperatures in steps of preselected magnitude, measuring the resistance of the necked-down region of the specimen at each temperature over the range, increasing the magnitude of the current passed through the necked-down region to a substantially higher value while maintaining the ambient temperature of the environment at a selected value within the range so that heating of the necked-down region is effected by the increased current passing therethrough and the resistance thereof changes, and measuring the change in resistance of the necked-down region of the specimen resulting from the increase in the magnitude of the current passed therethrough, the value of thermal conductivity of the specimen at the selected temperature bearing on the measured change in the resistance of the necked-down region in accordance with the following equation:

$$K = \frac{\sigma}{12 \delta R}(I_h^2 R^2)\left(\frac{dR}{dT}\right)$$

wherein:

$K$=thermal conductivity $R$=measured value of resistance of the necked-down region with the current of preselected magnitude passing therethrough $\sigma$=electrical conductivity of the specimen at the selected temperature as determined from the measured value of resistance (R)

$dR/dT$=temperature coefficient of resistance of the specimen at the selected temperature as determined from the measured value of resistance (R)

$\delta R$=measured change in the resistance of the necked-down region of the specimen $I_h$=current of increased magnitude (heating current) which effects the change in the resistance of the necked-down region 5. A method of measuring thermal conductivity of a material, which method comprises the steps of forming a specimen of the material in a necked-down configuration, suspending the formed specimen in an environment of controlled ambient temperature, passing an alternating current of predetermined magnitude through the necked-down region of the specimen, selectively varying the ambient temperature of the environment over a range of temperatures in steps of preselected magnitude, measuring the resistance of the necked-down region of the specimen at each temperature over the range, increasing the magnitude of the alternating current passed through the necked-down region to a substantially higher value while maintaining the ambient temperature at a selected value within the range so that heating of the necked-down region is effected by the increased current passing therethrough and the resistance thereof changes, and measuring the voltage developed across the necked-down region of the specimen with the increased alternating current passing therethrough, the value of thermal conductivity of the specimen at the selected temperature bearing on the measured value of voltage in accordance with the following equation:

$$K = \frac{1}{48}\frac{\sigma}{\delta V}(dR/dT)I_0^3 R^2 \cos 3\omega t$$

wherein:

$K$=thermal conductivity $R$=measured value of resistance of the necked-down region with the current of predetermined magnitude passing therethrough $\sigma$=electrical conductivity of the specimen at the selected temperature as determined from the measured value of resistance (R)

$dR/dT$=temperature coefficient of resistance of the specimen at the selected temperature as determined from the measured value of resistance (R)

$I_0$=alternating heating current which effects the change in the resistance of the necked-down region $\omega$=frequency of the alternating heating current passed through the necked-down region of the specimen $\delta V$=measured voltage corresponding to the change in the resistance ($\delta R$) of the necked-down region 6. A method of measuring the thermal conductivity of a material, which method comprises the steps of forming a specimen of the material in a necked-down configuration, suspending the formed specimen in an environment of controlled ambient temperature, passing an alternating current of preselected magnitude and frequency through the necked-down region of the specimen, selectively varying the ambient temperature of the environment over a range of temperatures in steps of preselected magnitude, measuring the voltage developed across the necked-down region during passage of current therethrough at each temperature over the range, increasing the magnitude of the alternating heating current to a substantially higher value while maintaining the frequency thereof at the predetermined value and the ambient temperature of the environment at a selected value within the range so that heating of the necked-down region is effected by the increased alternating current and the resistance thereof changes proportionately, and measuring the third harmonic component of the voltage developed across the necked-down region with the increased alternating current passing therethrough, the value of thermal conductivity of the specimen at the selected temperature bearing on the third harmonic component of the voltage in accordance with the following equation:

$$K = \frac{1}{48}\frac{\sigma}{\delta V}(dR/dT)I_0^3 R^2 \cos 3\omega t$$

wherein:

$K$=thermal conductivity of the specimen $R$=measured value of resistance of the necked-down region with the current of preselected magnitude passing therethrough $\sigma$=electrical conductivity of the specimen at the selected temperature as determined from the measured value of resistance (R)

$dR/dT$=temperature coefficient of resistance of the specimen at the selected temperature as determined from the measured value of resistance (R)

$I_0$=alternating heating current which effects the change in the resistance of the necked-down region $\omega$=frequency of the alternating heating current passed through the necked-down region of the specimen $\delta V$=measured voltage corresponding to the change in the resistance ($\delta R$) of the necked-down region 7. Controlled temperature apparatus for measuring thermal conductivity of a specimen of material having a portion which is reduced in cross-section, which comprises a cylindrical enclosure having a window provided in one portion of a side wall thereof, vacuum means for maintaining the enclosure in an evacuated state, a hollow cylindrical heater mounted within said enclosure, said heater being formed with cylindrical end portions and a spiraled central portion, a crucible mounted within said heater in spaced relation to the spiraled central portion thereof, said crucible having a slot provided in a side wall thereof in alignment with the window provided in said enclosure, a first and a second pair of conductors electrically connected to the specimen of material and extending into said crucible for suspending the specimen therein in spaced relation to the inner walls thereof, means connected to said first pair of conductors for passing current through the specimen, means connected to said second pair of conductors for measuring the voltage developed across the reduced portion of the specimen, and means for rendering said heater effective so that said crucible and the specimen are maintained at a uniform temperature during the passage of current therethrough and thermal energy is radiated thereby through the slot formed in said crucible, the thermal radiation emanating from said slot being substantially black-body radiation from which the temperature of the specimen within said crucible can be determined.

8. Controlled temperature apparatus for measuring thermal conductivity of a specimen of material formed in a necked-down configuration, which comprises a cylindrical enclosure having a window provided in one portion of a side wall thereof, means for maintaining the enclosure in an evacuated state, a hollow cylindrical heater mounted within said enclosure, said heater being formed with cylindrical end portions and a spiraled central portion, a crucible mounted within said heater in spaced relation to the spiraled central portion thereof, said crucible having a slot provided in a side wall thereof in alignment with the window provided in said enclosure and having a collar formed at the upper extremity thereof, said collar extending toward and forming a part of the inner wall of the upper cylindrical end portion of said heater, a plug seated within said collar, a first and second pair of conductors extending through said plug for suspending the specimen of material within said crucible in spaced relation to the inner walls thereof, means for passing an alternating current of preselected frequency through said first pair of conductors and said specimen, means electrically connected to said current passing means for amplifying the harmonic components of said alternating current, means electrically connected to said second pair of conductors for measuring the voltage developed across a portion of the specimen by the passage of said alternating current therethrough and for amplifying a selected harmonic component of said developed voltage, and electrode means for heating said heater and said crucible so that said crucible and said specimen are maintained at a uniform temperature and thermal energy is radiated thereby through the slot formed in said crucible, the thermal radiation emanating from said slot being substantially black-body radiation from which the temperature of the specimen within said crucible can be determined while said alternating current is concomitantly being passed therethrough.

9. A method of measuring thermal conductivity of a material having a determinable temperature coefficient of resistance, which method comprises the steps of forming a specimen of the material in a necked-down configuration, suspending the formed specimen in an environment having a controlled ambient temperature, passing a current of preselected magnitude through the necked-down region of the specimen, measuring the resistance of the necked-down region with the current of pre-selected magnitude passing therethrough, increasing the magnitude of the current passed through the necked-down region while maintaining the ambient temperature of the environment wherein the specimen is supended at a constant value so that heating of the necked-down region is effected by the increased current and the resistance thereof changes, and measuring the change in the resistance of the necked-down region of the specimen resulting from the increase in the magnitude of the current passed therethrough so that the thermal conductivity of the specimen can be determined from a relationship which expresses thermal conductivity in terms of the measured change in the resistance of the necked-down region.

References Cited in the file of this patent

UNITED STATES PATENTS 2,551,624 Moore ------------------ May 8, 1951

OTHER REFERENCES

Publication (1), Review of Scientific Instruments, vol. 21, June 1950, pages 507–508, article by Tomlinson et al. (73–15); (2) Review of Scientific Instruments, vol. 31, June 1960, pages 595–604, article by Rasor et al. (73–15).